(12) United States Patent
Kezmann (10) Patent No.: US 8,098,819 B2
(45) Date of Patent: Jan. 17, 2012

(54) METHOD, SYSTEM AND SECURING MEANS FOR DATA ARCHIVING WITH AUTOMATIC ENCRYPTION AND DECRYPTION BY FRAGMENTATION OF KEYS

(75) Inventor: Bruno Rudolf Kezmann, Steinhausen (CH)

(73) Assignee: Tecnostore AG, Luzern (CH)

( * ) Notice: Subject to any disclaimer, the term of this patent is extended or adjusted under 35 U.S.C. 154(b) by 524 days.

(21) Appl. No.: 11/631,237

(22) PCT Filed: Jun. 30, 2005

(86) PCT No.: PCT/CH2005/000363
§ 371 (c)(1),
(2), (4) Date: Jun. 4, 2008

(87) PCT Pub. No.: WO2006/002564
PCT Pub. Date: Jan. 12, 2006

(65) Prior Publication Data
US 2008/0285754 A1    Nov. 20, 2008

(30) Foreign Application Priority Data

Jul. 1, 2004 (EP) .................................... 04015475

(51) Int. Cl.
*H04L 9/00* (2006.01)
(52) U.S. Cl. ............ 380/44; 380/28; 380/255; 380/259; 713/155
(58) Field of Classification Search .................... 380/28, 380/44, 255, 259; 713/155
See application file for complete search history.

(56) References Cited

U.S. PATENT DOCUMENTS 5,802,175 A * 9/1998 Kara ............................. 380/277
5,940,507 A   8/1999 Speare et al. ...................... 380/4
(Continued)

FOREIGN PATENT DOCUMENTS

JP        2-110491        4/1990
(Continued)

OTHER PUBLICATIONS

Shibata et al., "Mechanisn-based KPI",Computer Security Symposium 2003, Japan, Information Processing Society of Japan, Oct. 29, 2003, vol. 15, pp. 181-186.

*Primary Examiner* — Vivek Srivastava
*Assistant Examiner* — Michael D Anderson
(74) *Attorney, Agent, or Firm* — Ohlandt, Greeley, Ruggiero & Perle, LLP; George W. Rauchfuss, Jr.

(57) ABSTRACT

In the method for data archiving with automatic en- and decryption data (9, 10) are exchanged between a client station (1) and an archive station (4). A securing means (2) connected between the stations (1, 4) encrypts the plain data (9) which are transmitted towards the archive station (4) and decrypts the encrypted data (10) which are transmitted towards the client station (1). The encryption is carried out with at least two keys (6, 7). One of the two keys (6, 7) is swapped out by transmitting it to the archive station (4) and deleting it locally, i.e. in the securing means (2), after the encryption. If the securing station (2) is stolen, the encrypted data (10) on the archive station (4) can be accessed, however their decryption can be prevented in a simple, reliably and comprehensible manner by deleting the swapped out key (7) in the archive station (4).

58 Claims, 4 Drawing Sheets

U.S. PATENT DOCUMENTS

| | | | | |
|---|---|---|---|---|
| 6,134,660 | A | 10/2000 | Boneh et al. | 713/193 |
| 6,185,681 | B1 | 2/2001 | Zizzi | 713/165 |
| 6,259,789 | B1 * | 7/2001 | Paone | 380/28 |
| 6,292,569 | B1 * | 9/2001 | Shear et al. | 380/255 |
| 6,351,536 | B1 * | 2/2002 | Sasaki | 380/44 |
| 6,839,843 | B1 | 1/2005 | Bacha et al. | 713/176 |
| 2004/0068650 | A1 * | 4/2004 | Resnitzky et al. | 713/155 |
| 2006/0075258 | A1 | 4/2006 | Adamson et al. | 713/189 |

FOREIGN PATENT DOCUMENTS

| | | |
|---|---|---|
| JP | 2001-508627 | 6/2001 |
| JP | 2002-157167 | 5/2002 |
| WO | WO98/32065 | 7/1998 |
| WO | WO2004/046899 A2 | 6/2004 |

\* cited by examiner

METHOD, SYSTEM AND SECURING MEANS FOR DATA ARCHIVING WITH AUTOMATIC ENCRYPTION AND DECRYPTION BY FRAGMENTATION OF KEYS

CROSS REFERENCE TO RELATED APPLICATIONS

This application claims the priority of European Patent Application No. 04 015 475.9, filed on Jul. 1, 2004, the disclosure of which is incorporated herewith by reference.

TECHNICAL FIELD

The invention relates to a method for data archiving with automatic en- and decryption according to the preamble of claim 1. The invention further relates to a system for data archiving with automatic en- and decryption according to the preamble of claim 29 and to a securing means.

The term "archiving" in the present document is to be understood such that it covers the storing in an archive as well as the retrieval from an archive.

BACKGROUND ART

Methods and systems of this kind serve for archiving data of one or several client stations on an archive station. Archiving of data on a central archive station has the advantage of a better security regarding data loss and data theft. An archive station can be installed in an especially secured room, which is not always possible at client- or workstations. Further it is easier to make backup copies of the stored data of the archive station on a regular basis, than of a plurality of client stations.

However, a central archiving comes with the requirement that the data has to be transferred between the client stations and the archive station and that different customers or users share the archive station. This requires special security provisions. It is known, for this purpose, to encrypt the data of the client station, before it is transmitted to the archive station, and to decrypt it again after it is transmitted back from the archive station. In the encryption for example a smart card, a so-called "token", can be used in which the key is stored and which is protected by a password.

Passwords have the disadvantage that they can be forgotten, exchanged or written down by the user and than be stolen. The same applies for encryption hard- and software. It can be stolen as well or at least the documentation necessary for a reproduction can be stolen. Therefore it is often relatively easy for hackers to access the archived data. A further weakness are the operating systems of client and archive station, which have generally a plurality of security holes. Further, at known systems, for installation and use, i.e. in particular the archiving of data, often a plurality of user interactions are necessary, which costs working time and increases the fault frequency. The requirements user-friendliness, reliability and security are achieved at the known systems only imperfect or unbalanced.

WO 2004/046899 describes a method for storing music data of an MP3 player on a PC. This document mentions to use a seed within the header of the data and the number stored in the header serves for identification of the data and is not a key. No separate storing of data and seeds is provided. The source and the final location contain non encrypted data, so encryption is used only for transmission. The key is newly generated for each transmission and stored parallel with the data. The key has two parts, a constant and a variable. The variable is generated for each transmission and transmitted within the header of the data but the key is not transmitted. The receiver takes the variable from the head and generates the key from the variable and the constant. When data have arrived a the final location they are not encrypted and can be used several times. There is no separate means for encryption that is physically separated from the client station and the document defines no method to secure archived data when the player is stolen. No method is shown for replacing a defect or stolen device. U.S. Pat. No. 5,940,507 shows a method where the source contains non encrypted data and the destination contains encrypted data. The transmitter of the source encrypts data with a key that is itself-encrypted. At the location safe encrypted data and the encrypted key is stored in parallel. If a third person wants to read the stored data from the safe an authorizing key is needed that is given only by the transmitter. With this special key first the encrypted key is decrypted an afterward the data are decrypted with this key. There is no third key nor is there a safeguard against reading of the first key from the location.

DISCLOSURE OF THE INVENTION

Therefore there is the problem to provide a method of the kind mentioned at the outset, which avoids the disadvantages mentioned above at least partially.

This problem is solved by claim 1 or claim 29 or the securing device by using, in each case, at least a first and a second key for the en- and decryption of the data, wherein the second key is swapped out between en- and decryption at least temporarily and deleted locally in the securing means.

This solution has the advantage that it does not require passwords. In the case of a stolen securing means the unauthorized access to the archived data can be blocked by blocking the swapped out second key.

The present invention has is concerned with a method and system where the source (client) contains non encrypted data and the final location (server) contains the encrypted data only. On their way from the source to the final location the data are encrypted and vice versa. The securing device, preferably a separate physical unit, is needed for handling the keys. In an initial step (system configuration) the user enters a password or certificate. This password or certificate is fragmented by the securing device or means, at least into two parts or fragments or keys, respectively, and preferably into three parts/fragments/keys. Analysing these fragments will not lead back to the password/certificate. A fragment itself is not a functional element alone and thus not a "key" in the classical sense and is not useful alone. Nevertheless, as the description proceeds, the expression "key" or "keyfragments" will be used for the parts/fragments as well. The fragment itself can be encrypted. The source is connected to the final location and the keyfragments are dispatched. One fragment is stored parallel to the final location, one fragment is stored parallel with the source and optionally a third fragment is stored in a secure part of the securing means or securing box, respectively. Fragmentation has the result that only in case of a correct connection from source to final location the dispatched fragments can be read. A non original or manipulated connection can be detected and reading of the fragments can be blocked. If the source and/or the final location can not be reached by the securing means it is not possible to read the fragments. Thus the securing means denies service. The optional third fragment stored in the securing device or means, respectively, serves on the one hand for protection against manipulation of the securing means and for a further control of the correct connection of source an final location, in particular in case of theft. During normal service of the method and system data are transferred from source to final location via the securing device and are encrypted thereby and decrypted in the opposite direction. The key needed for encryption/decryption is collected beforehand in form of its fragments from the different locations of these fragments and by putting the fragments together. This happens for each transaction of data (from source to final location and back) each time anew. The data in the source may be deleted after transmission to the final location, so that only the encrypted data in the final location are accessible when the connection from source to final location is correctly established and the outsourced/dispatched fragments form together again a correct full key.

As compared to the prior art the present invention and its preferred embodiments provides a securing means, preferably as physically separate box, which securing means is necessary for the transmission of data from source to final location. The securing means encrypts and decrypts the data passing through it. The securing means fragments the password/certificate and dispatched/outsources the fragments (within the source, the final location and optionally the securing means itself). The securing means checks the validity and integrity of the connection of source and final location by checking the dispatched/outsourced fragments. The securing means validates itself by the optional third fragment stored therein. Since the single fragments are themselves not functional high security is achieved and even the possession of all fragments is not sufficient enough for encryption/decryption since the securing means is needed for refragmentation and thus building a functional key from the fragments. There are no parts of the key stored in the head of the data.

The method and the system and the securing means according to the invention and its preferred embodiments has the advantage of security and control. The path between source and final location is protected. A theft of the securing means and its operation at another physical location is detected and operation can thus be denied. By the dispatchment/outsourcing of the fragments it is possible that the user on both sides (source and final location) can interrupt operation at any time by blocking or removing the respective fragment. Only by successful restoration of the 2 to 3 fragments is it possible to get a valid key. The fragment within the security box validates the internal "intelligence" of the security means. In the present invention it is possible to use any algorithm for encrypting. Keys can have any length and any length of passwords can be handled.

BRIEF DESCRIPTION OF DRAWINGS

Further advantages and preferred embodiments result from the dependent claims as well as the following description, which makes reference to the figures. These figures show:

BEST MODE FOR CARRYING OUT THE INVENTION

Figure 1:
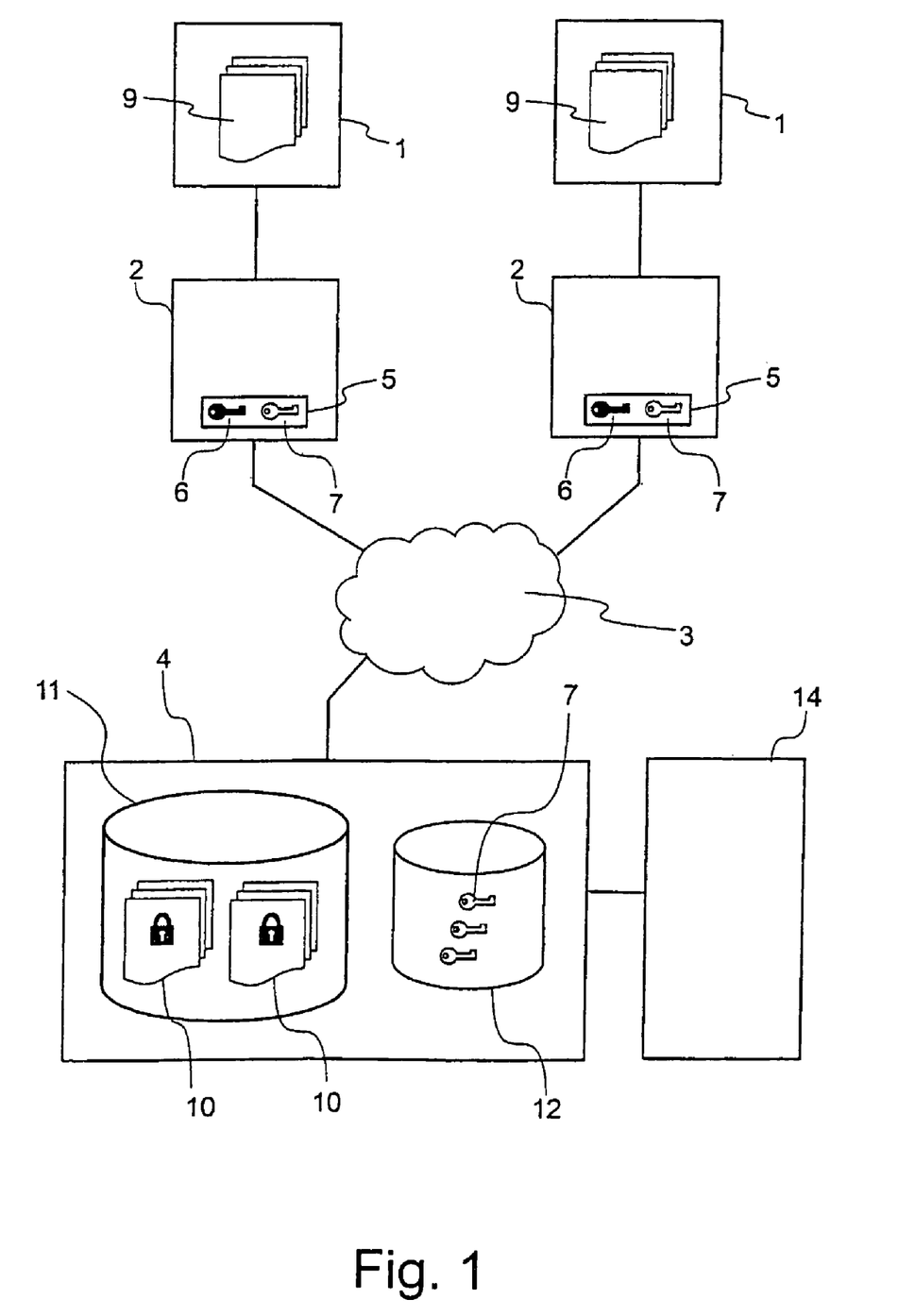
FIG. 1 a block diagram of a preferred embodiment of a system for archiving data based on the method according to the invention, FIG. 2a a flow diagram of a method for storing data to be performed in the system of FIG. 1, FIG. 2b a flow diagram of a method for retrieving data to be performed in the system of FIG. 1, FIG. 3 a block diagram of a further preferred embodiment of a system for archiving data based on the method according to the invention, FIG. 4a a flow diagram of a method for storing data to be performed in the system of FIG. 3, FIG. 4b a flow diagram of a method for retrieving data to be performed in the system of FIG. 3.

FIG. 1 shows a block diagram of a preferred embodiment of a system for archiving of data 9, 10 based on the method according to the invention. Several, here as an example two, client stations 1 are provided. On these plain, i.e. unencrypted, data 9 is stored. Further, for each client station 1 a securing means 2 is provided. The securing means 2 serves for en- and decrypting of data 9, 10. For this, it comprises at least a first key 6 and temporarily a second key 7 or fragments 6, 7. The securing means 2 communicate with the archive station 4 over the network 3. In the archive station 4, the encrypted data 10 are stored in a data storage 11. Further the second keys 7, which belong in each case to the encrypted data 10, are stored in a key storage 12.

The data 9, 10 can occur as plain data 9, as well as encrypted data 10, i.e. in particular be stored and/or be transmitted. If the term "data" is used in the present document without the attribute "plain" or "encrypted", the information content of the data 9, 10 is meant, independent of the encryption state. The encrypted data 10 which belong to particular plain data 9 are, according to this interpretation instruction, the same data 9, 10. The combination of reference numerals "9, 10" is to be understood such that the data 9, 10 can occur generally both plain and encrypted, however, in the particular context, also only one can apply.

Figure 2A:
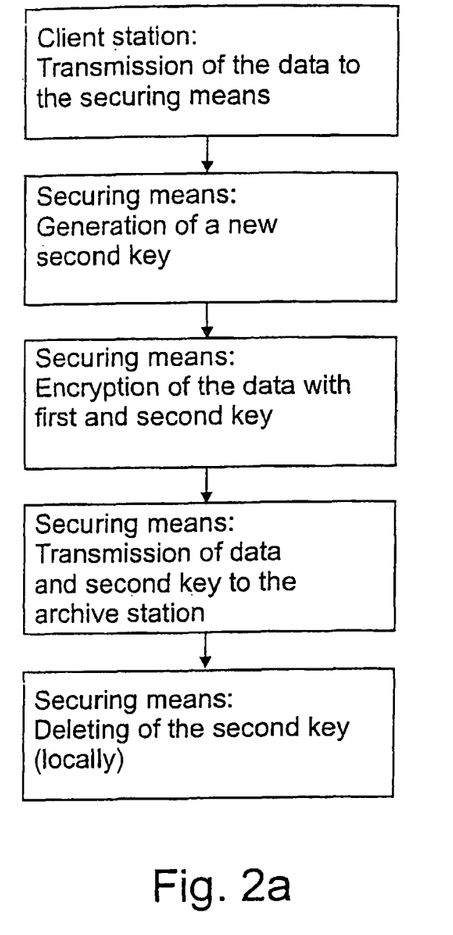

The methods described in the following referring to FIGS. 2a and 2b constitute together, i.e. performed consecutively, an embodiment of the method for data archiving according to the invention. The embodiment is based on an encryption with two keys 6, 7:

FIG. 2a shows a flow diagram of a method for storing data 9, 10 to be performed in the system of FIG. 1. During the archiving the plain data 9 is at first transmitted from the client station 1 to the securing means 2. The securing means 2 generates then, or already at an earlier point in time, a new second key 7. The plain data 9 are encrypted by the securing means 2 at least with the first key 6 or fragment 6, respectively, and the second key 7 and afterwards transmitted as encrypted data 10 to the archive station 4 (final location). The second key 7 or fragment 7, respectively, is also transmitted to the archive station 4 and is then erased locally, i.e. in the securing means 2. The transmission of the second key 7 can be carried out together with the encrypted data 10, for example in the header of a film.

Figure 2B:
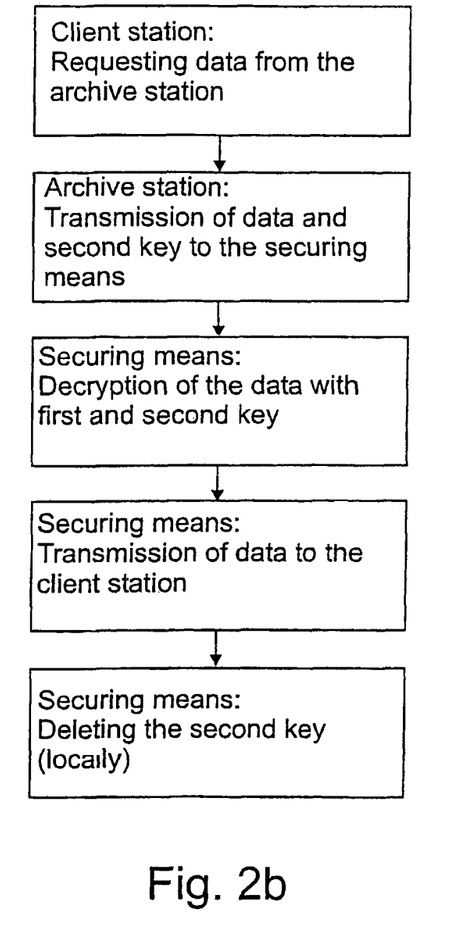

FIG. 2b shows a flow diagram of a method for retrieving data 9, 10 to be performed in the system of FIG. 1. First, the client station 1 requests data 9, 10 at the archive station 2 which then becomes the source instead of the final location. The requested data 9, 10 are transmitted as encrypted data 10 by the archive station 4 together with the thereto belonging second key 7 to the securing means 2, are there decrypted using the first and the second key 6, 7 and thereafter transmitted as plain data 9 to the client station 1. Afterwards, the second key 7 is erased again in the securing means 2.

Figure 3:
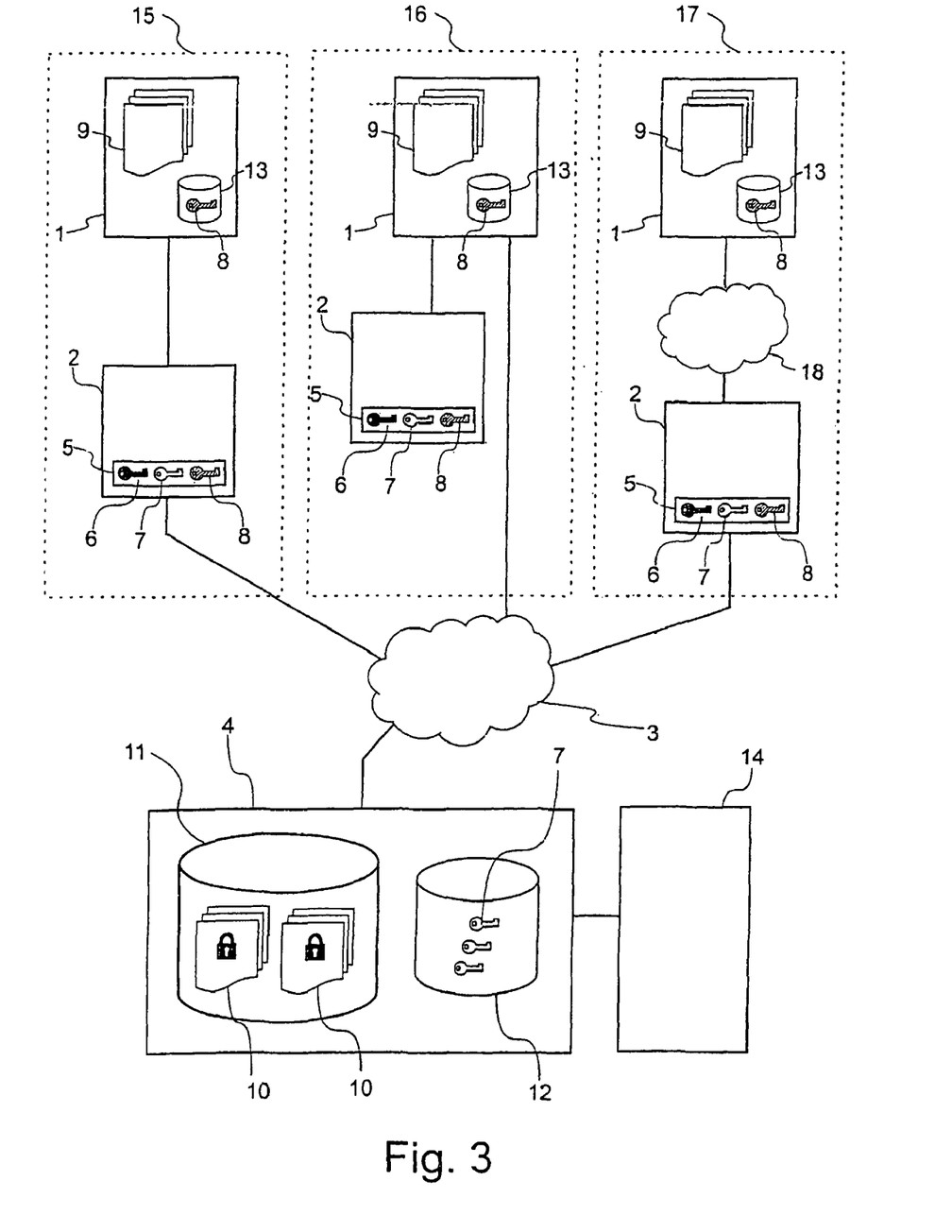

FIG. 3 shows a block diagram of a further preferred embodiment of the system for archiving of data 9, 10 based on the method according to the invention. In contrast to the system of FIG. 1 a third key 8 is provided. In each case, between en- and decryption, this third key 8 is swapped out to the client station 1. For this purpose, the client station 1 comprises preferably a key storage 13. Further, as an example, three different connection configurations 15, 16, 17, each for a client station 1 and a securing means 2 belonging thereto, are shown. The first configuration 15 corresponds to the solution of FIG. 1. The securing means 2 is connected between client station 1 and archive station 4. At the second configuration 16, the client station 1 is connected directly to the network 3. The securing means 2 is connected to the client station 1 and communicates indirectly through it with the archive station 4. At the third configuration 17 a client station 1 is connected to the securing means 2 via a local network 18.

Figure 4A:
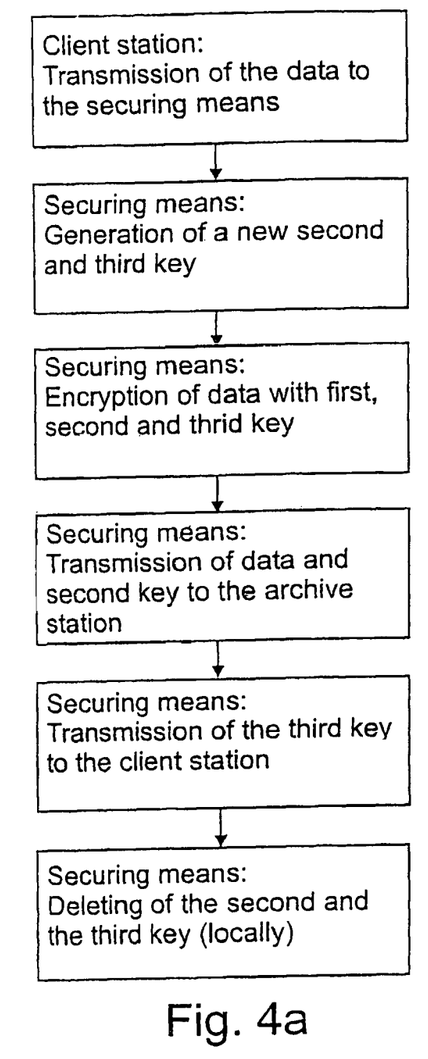

The methods described in the following referring to FIGS. 4a and 4b constitute together, i.e. executed consecutively, a further embodiment of the method for data archiving according to the invention. The embodiment is based on an encryption with three keys 6, 7, 8:

FIG. 4a shows a flow diagram of a method for storing data 9, 10 to be performed in the system of FIG. 3. At the archiving the plain data 9 are transmitted from the client station 1 to the securing means 2. The securing means 2 generates then, or already at an earlier point in time, a new second and a new third key 7, 8. The securing means 2 encrypts the plain data 9 at least with the first key 6, the second key 7 and the third key 8 an % then transmits them to the archive station 4. The second key 7 is also transmitted to the archive station 4. The third key 8 is transmitted to the client station 1. Afterwards, the second, as well as the third key 7, 8 are deleted locally, i.e. in the securing means 2. The transmission of the second key 7 can be carried out together with the data 9, 10, for example in the header of a file.

Figure 4B:
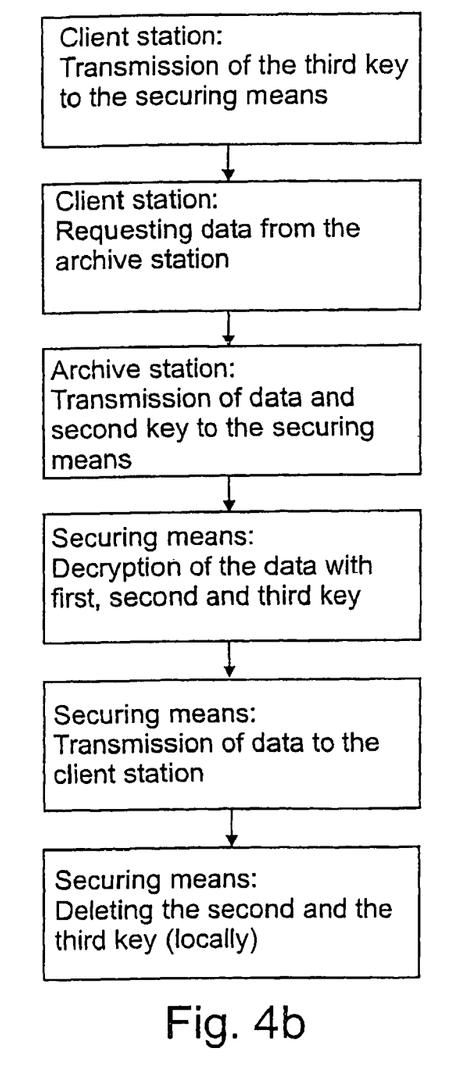

FIG. 4b shows a flow diagram of a method for retrieving data 9, 10 to be performed in the system of FIG. 3. The client station 1 transmits the third key 8 to the securing means 2. Afterwards or simultaneously it requests data 9, 10 at the archive station 2. The requested data 9, 10 are transmitted from the archive station 4 to the securing means 2 as encrypted data 10 together with the second key 7 belonging thereto, are there decrypted using the three keys 6, 7, 8 and are then transmitted as plain data 9 to the client station 1. After the decryption the second and the third key 7, 8 is deleted in the securing means 2.

The variations of embodiments and comments described in the following refer to the entirety of possible embodiments of the method according to the invention, thus in particular to the embodiment with two keys according to FIG. 1, FIG. 2a and FIG. 2b as well as the embodiment with three keys according to FIG. 3, FIGS. 4a and 4b:

For the encryption preferably a symmetric encryption algorithm is used, in particular the 3DES, IDEA or blowfish algorithm. For the encryption with multiple keys either a multiple encryption can be performed or the keys are merged and an encryption with an accordingly longer merged key 5 is performed.

The length of the keys 6, 7 and, as the case may be, 8 can for example be 1024, 2048 or 4096 bit. For a secure operation each of the keys 6, 7 and, as the case may be, 8 should have a length of at least 100 bit.

The first key 6 is preferably constant, i.e. it is preferably generated using a random generator and stored during production or initial operation of the securing means 2. A copy of the first key 6 can be kept outside of the system, for example by the operator of the archive in a safe, in order to be able to manufacture with it a replacement device in case of a loss or breakdown of the securing means 2. The securing means 2 is preferably designed such that the first key 6 can be stored, but cannot be retrieved or can only be retrieved once. It's a kind of "device key" or "private key", however not in the sense that there would be a corresponding "public key" to it.

The second key 7 is preferably regenerated before each data archiving, preferably in the securing means using a random generator. In doing so, all data or files transmitted within one archiving, i.e. transmitted substantially together, are encrypted with the same second key 7. However, it is also possible to generate a new second key 7, in each case, for each file or group of files and to swap it out after the use. Further it is possible to provide only one constant second key 7, which is for example swapped out to the archive station 4 and which, in each case, is transmitted to the securing means 2 before encryptions. In the embodiments of FIG. 1 and FIG. 3 the second key 7 is swapped out to the archive station 4 and is in particular transmitted there and transmitted back from there together with the encrypted data 10. In this context, the second key 7 can also be called "data accompanying key" due to its function.

The third key 8 is, as far as such a key is used, also newly generated preferably in the securing means 2 by use of a random generator, preferably before each data archiving. In this process, for each file or each group of files transmitted together, in each case, a new third key 8 can be generated. In the embodiment of FIG. 3 the third key 8 is swapped out to the client station 1. In order to retrieve data from the archive, the third key 8 is transmitted back to the securing means 2. In this context, due to its function, it can also be called "data retrieval key".

If data is archived several times and the second and, as the case may be, third key 7, 8 is generated newly in each case, there are several second and, as the case may be, third keys 7, 8.

The communication between the securing means 2 and, as the case may be, the client stations 1, and the archive station 4 is carried out preferably over a network 3. This can be in particular a wide area network, i.e. WAN, such that a "remote data archiving" is possible. The network 3 can in particular be a public data network, for example the internet. It can further be a network which complies with the Ethernet standard and/or be a virtual private network and/or be designed for remote access according to the standard RAS, i.e. remote access service.

The communication between the client station 1 and the securing means 2 and the communication between the securing means 2 and the archive station 4 can, in a special embodiment, also be carried out over the same network.

The securing means 2 is preferably a physical unit. It can be a "box" with connectors for a network and/or a computer. In particular it can be a PC card, i.e. a credit card size extension board for computers with PCMCIA-socket (personal computer memory card international association) or a USB-device, i.e. a device according to the USB-standard (universal serial bus).

The blank data 9 on the client station 1 can in particular be in the form of a file or several files.

The client station 1 is usually a client computer. However, it can also be a server computer or an embedded system. The method according to the invention can be carried out with one client station 1 only, however in most cases several client stations 1 will be provided. The client stations 1 can be different regarding hardware and software. In a special embodiment of the invention the client station 1 and the archive station 4 are the same computer. In particular in the case of several client stations 1 it is important that it is checked by the archive station 4, if a client station 1 or its securing means 2 is authorized to receive the requested data and the second key 7 which belongs to it. A transmission is only carried out if such an authorization is present. In this process in particular the sender address of the data request, i.e. the ISDN number or IP address, and/or a signature of the client station 1 and/or the securing means 2 belonging thereto is checked.

The archive station 4 is usually a server or consists of several servers, i.e. computers providing services. In particular a first and a second server can be provided, wherein encrypted data 10 are stored on the first server and the second keys 7 belonging thereto are stored on a second server. However, the second keys 7 can also be stored on one or several special hardware modules, in particular on a PCI-Adapter. This has the advantage that for blocking of encrypted data 10 on the archive station 2 simply the hardware module has to be removed. Further the second keys 7 can be stored encrypted on the archive station 4. In addition, the archive station 4 comprises preferably for backup of the stored data, i.e. in particular of the encrypted data 10 and/or of the second keys 7, a storage unit 14 for redundant data storing, i.e. a backup system, in particular a tape deck, a disk-array or a CD- or DVD-writer. The stored data of the archive station 4 is preferably saved in regular intervals, for example daily, on the storage unit 14. The archive station 4 is preferably arranged in a protected room, in particular in a bunker or in an underground shelter.

In particular if a securing means 2 is stolen the access to the encrypted data 10 of the archive station 4 over this securing means 2 must be blocked. Such a blocking of encrypted data 10 is preferably carried out by removing the second key 7 or second keys 7 from the system, for example by removing the key store as hardware module, as already described above, or by copying the second keys 7 to a data carrier and deleting them in the archive station 4. Though the encrypted data 10 can then be retrieved, they cannot be decrypted. For unblocking the second keys 7 are copied back to the archive station 4 again. This procedure has, among other things, the advantage that the access to the data can be blocked and unblocked without using corresponding functions of the operating system, the security of which, for the most part, cannot be verified.

At an embodiment of the invention with three keys 6, 7, 8, the blocking of the encrypted data 10 can alternatively be carried out by erasing of the second keys 7 in the archive station 4 or by erasing of the third keys 8 in the client station 1 or by performing both.

When deleting keys or removing keys from the system such as described in this document, it is to be regarded that the data is actually physically erased and no temporary files or restorable files remain. Further the transmission path should not have a memory, i.e. the information stored in intermediate stations or network nodes, for example for buffering, should be deleted after the transmission.

At the embodiments described referring to FIGS. 2a, 2b, 3a and 3b reception, en- or decryption and transmission of data 9, 10 by the securing means 2 is defined exemplary as separate, sequential method steps. However, it is obvious to the person skilled in the art that these steps can also be performed simultaneously. In doing so, the data are treated as data stream. The advantage of such an embodiment is on one hand a higher speed and on the other hand the fact that not all data 9, 10 which belong to the same key set have to be buffered in the securing means 2 simultaneously.

In the described embodiments of the invention, in each case, at least a first and a second key 6, 7 is provided, wherein the first key 6 is a "device key" or "private key" and is not swapped out. This first key 6 can also be omitted, if a secret algorithm or an algorithm modified with secret parameters is used as a replacement for it.

The system for performing the method according to the invention is preferably configured such that the data encryption is carried out fully automatically in the background and no user input and in particular no password inputs are necessary.

The invention claimed is:

1. Method for data archiving with automatic encryption and decryption comprising:
   at a storing of unencrypted data (9, 10) at a client station (1), transmitting said unencrypted data from said client station to a securing unit (2),
   encrypting said unencrypted data at said securing unit with a first key (6) and a second key (7);
   transmitting said encrypted data from said securing unit to an archive station (4);
   at a retrieval of said encrypted data transmitting said encrypted data from said archive station to said securing unit;
   decrypting said encrypted data at said securing unit with said first and second keys;
   transmitting said decrypted data from said securing unit to said client station; and swapping out said second key between said encryption and decryption steps at least temporarily and deleting said second key locally in the securing unit; and
   wherein a composing key (5) is formed from at least the first and second keys and the encryption and decryption is in each case carried out using the composed key.

2. Method according to claim 1, wherein the second key (7) is swapped out, by transmitting it to the archive station (4), storing it there and transmitting it later back again.

3. Method according to claim 2, wherein the second key (7) is transmitted together with the encrypted data (10) to the archive station (4) and/or is transmitted back to the securing unit (2) together with the encrypted data (10).

4. Method according to claim 1, wherein for the encryption and decryption of the data, in each case, further a third key (8) is used additionally, which is swapped out between the encryption and decryption at least temporarily and is deleted locally in the securing unit (2).

5. Method according to claim 4, wherein the third key (8) is swapped out by transmitting it to the client station (1), storing it there and transmitting it later back again.

6. Method according to claim 4, wherein the composed key (5) is formed from the first, the second and the third key (6, 7, 8) and the encryption and decryption, in each case, is carried out using this composed key (5).

7. Method according to claim 1, wherein a symmetric encryption algorithm is used at the encryption and decryption, in particular the 3DES-, IDEA- or blowfish algorithm.

8. Method according to claim 4, wherein the first key (6) and/or the second key (7) and/or, as the case may be, the third key (8) have, in each case, a length of at least 100 bit.

9. Method according to claim 4, wherein the first key (6) and/or the second key (7) and/or, as the case may be, the third key (8) have, in each case, a length of about 1024, 2048 and/or 4096 bit.

10. Method according to claim 1, wherein the first key (6) is generated and stored during a production or initial operation of the securing unit (2), in particular using a random generator.

11. Method according to claim 1, wherein the securing unit (2) is designed such that the first key (6) cannot be transmitted to other units and in particular cannot be read out.

12. Method according to claim 1, wherein before the storing of data, in each case, the second key (7) and/or, as the case may be, the third key (8) is newly generated, in particular using a random generator.

13. Method according to claim 4, wherein the second key (7) and/or, as the case may, be the third key (8) are generated by the securing unit (2).

14. Method according to claim 1, wherein a communication between the client station (1) and the securing unit (2) is carried out over a network (18).

15. Method according to claim 1, wherein a communication between the securing unit (2) and the archive station (4) is carried out over a network (3).

16. Method according to claim 15, wherein the network (3) complies with the Ethernet standard and/or is a virtual private network and/or is designed for remote access according to RAS, i.e. remote access service.

17. Method according to claim 1, wherein the securing unit (2) is a physical unit, in particular a PC card or a USB device.

18. Method according to claim 1, wherein the data (9, 10) is transmitted and stored in the form of a file or several files.

19. Method according to claim 18, wherein the second key (7) is transmitted in a header part of the files or, as the case may be, of one of the files to the archive station (4).

20. Method according to claim 18, wherein, as the case may be, for each of the files or each group of files transmitted together a separate second key (7) and/or, as the case may be, a separate third key (8) is generated.

21. Method according to claim 1, wherein further client stations (1) are provided.

22. Method according to claim 1, wherein before a transmission of the data (9, 10) from the archive station (4) to the client station (1), it is checked, whether the client station (1) is authorized to receive the data (9, 10), and a transmission is only carried out if the client station (1) is authorized.

23. Method according to claim 22, wherein during a checking, whether the client station (1) is authorized to receive the data (9, 10), an ISDN number and/or an IP address of a sender of a data request is checked.

24. Method according to claim 1, wherein an authorization to retrieve the data (9, 10) from the archive station (4) is, if necessary, disabled, by withdrawing the second key (7), which belongs to the data (9, 10), on the archive station (4) from a remote access, in particular by deleting it or swapping it out and deleting it.

25. Method according to claim 1, wherein the archive station (4) comprises a first and a second server computer, wherein the first server computer is provided for a storing of the encrypted data (10) and the second server computer is provided for storing the second key or, as the case may be, second keys (7).

26. Method according to claim 1, wherein the second key or, as the case may be, second keys (7) are stored on the archive station (4) encrypted and/or in a hardware module or adapter.

27. Method according to claim 1, wherein the data (9, 10) and/or the second key or, as the case may be, second keys (7) of the archive station (4) are copied for data backup to a storage unit (14), in particular to a tape deck, a CD, a DVD or a disk array.

28. Method according to claim 1, wherein the archive station (4) is arranged in a protected room, in particular in a bunker or in an underground shelter.

29. System for data archiving with automatic encryption and decryption comprising:
a client station (1), a securing unit (2) and an archive station (4);
wherein at a storing of unencrypted data (9) at said client station said client station transmits said unencrypted data to said securing unit;
wherein said securing unit encrypts said unencrypted data with a first key (6) and a second key (7) and transits said encrypted data (10) from said securing unit to archive station;
wherein at a retrieval of said encrypted data said archive station transmits said encrypted data to said securing unit wherein said securing units decrypts said encrypted data with said first and second keys and transmits said decrypted data to client station;
wherein between said encryption and decryption of said data said second key is swapped out from said securing unit at least temporarily and said second key is deleted locally in said securing unit; and
wherein a composing key (5) is formed from at least the first and second keys and the encryption and decryption is in each case carried out using the composed key.

30. System according to claim 29, wherein the second key (7) is swapped out, by transmitting it to the archive station (4), storing it there and transmitting it later back again.

31. System according to claim 29, wherein the second key (7) is transmitted together with the encrypted data (10) to the archive station (4) and/or is transmitted back to the securing unit (2) together with the encrypted data (10).

32. System according to claim 29, wherein for the encryption and decryption of the data (9, 10), in each case, further a third key (8) is used additionally, which is swapped out between the encryption and decryption at least temporarily and is deleted locally in the securing means (2).

33. System according to claim 32, wherein the third key (8) is swapped out by transmitting it to the client station (1), storing it there and transmitting it later back again.

34. System according to claim 32, wherein a composed key (5) is formed from the first, the second and the third key (6, 7, 8) and the encryption and decryption, in each case, is carried out using this composed key (5).

35. System according to claim 29, wherein a symmetric encryption algorithm is used at the encryption and decryption, in particular the 3DES-, IDEA- or blowfish algorithm.

36. System according to claim 32, wherein the first key (6) and/or the second key (7) and/or, as the case may be, the third key (8) have, in each case, a length of at least 100 bit.

37. System according to claim 32, wherein the first key (6) and/or the second key (7) and/or, as the case may be, the third key (8) have, in each case, a length of about 1024, 2048 and/or 4096 bit.

38. System according to claim 29, wherein the first key (6) is generated and stored during a production or initial operation of the securing unit (2), in particular using a random generator.

39. System according to claim 29, wherein the securing unit (2) is designed such that the first key (6) cannot be transmitted to other units and in particular cannot be read out.

40. System according to claim 29, wherein before the storing of data (9, 10), in each case, the second key (7) and/or, as the case may be, the third key (8) is newly generated, in particular using a random generator.

41. System according to claim 29, wherein the second key (7) and/or, as the case may, be the third key (8) are generated by the securing means (2).

42. System according to claim 29, wherein a communication between the client station (1) and the securing unit (2) is carried out over a network (18).

43. System according to claim 32 wherein a communication between the securing unit (2) and the archive station (4) is carried out over a network (3).

44. System according to claim 43, wherein the network (3) complies with the Ethernet standard and/or is a virtual private network and/or is designed for remote access according to RAS, i.e, remote access service.

45. System according to claim 29, characterized in that the securing unit (2) is a physical unit, in particular a PC card or a USB device.

46. System according to claim 29, wherein the data (9, 10) is transmitted and stored in the form of a file or several files.

47. System according to claim 46, wherein the second key (7) is transmitted in a header part of the files or, as the case may be, of one of the files to the archive station (4).

48. System according to claim 46, wherein as the case may be, for each of the files or each group of files transmitted together a separate second key (7) and/or, as the case may be, a separate third key (8) is generated.

49. System according to claim 29, wherein further client stations (1) are provided.

50. System according to claim 29, wherein before a transmission of the encrypted data (10) from the archive station (4) to the client station (1), it is checked, whether the client station (1) is authorized to receive the data (9, 10), and a transmission is only carried out if the client station (1) is authorized.

51. System according to claim 50, wherein during a checking, whether the client station (1) is authorized to receive the decrypted data an ISDN number and/or an IP address of a sender of a data request is checked.

52. System according to claim 29, wherein an authorization to retrieve the encrypted data (10) from the archive station (4) is, if necessary, disabled, by withdrawing the second key (7), which belongs to the data, on the archive station (4) from a remote access, in particular by deleting it or swapping it out and deleting it.

53. System according to claim 29, wherein the archive station (4) comprises a first and a second server computer, wherein the first server computer is provided for a storing of the encrypted data (10) and the second server computer is provided for storing the second key or, as the case may be, second keys (7).

54. System according to claim 29, wherein the second key or, as the case may be, second keys (7) are stored on the archive station (4) encrypted and/or in a hardware module or adapter.

55. System according to claim 29, wherein the data and/or the second key or, as the case may be, second keys (7) of the archive station (4) are copied for data backup to a storage unit (14), in particular to a tape deck, a CD, a DVD or a disk array.

56. System according to claim 29, wherein the archive station (4) is arranged in a protected room, in particular in a bunker or in an underground shelter.

57. Securing unit (2) with the features of claim 29.

58. Securing means (2) according to claim 57 wherein the securing unit is a stand alone box.

* * * * *